United States Patent Office 3,636,217
Patented Jan. 18, 1972

3,636,217
MILDEWCIDAL COMPOSITION AND
METHOD OF USE
Donald R. Arnold, Lincolndale, N.Y., and Anthony A.
Sousa, Raleigh, N.C., assignors to Union Carbide Corporation, New York, N.Y.
No Drawing. Application Mar. 23, 1966, Ser. No. 536,662,
now Patent No. 3,478,043, dated Nov. 11, 1969, which
is a continuation-in-part of application Ser. No. 324,183,
Nov. 18, 1963. This application June 25, 1969, Ser.
No. 836,638
Int. Cl. A01n 9/00, 9/22
U.S. Cl. 424—263        6 Claims

ABSTRACT OF THE DISCLOSURE

Novel compositions containing oxetanes, such as the 3-oxatricyclo[4.2.1.0]nonanes, as the active ingredient, are useful for controlling mildew.

---

This application is a divisional of U.S. application Ser. No. 536,662 entitled "3-Oxatricyclo[4.2.1.0$^{2,5}$]nonanes and Use Thereof" filed Mar. 23, 1966 by D. R. Arnold and A. A. Sousa, now U.S. Pat. No. 3,478,043. Ser. No. 536,662 is a continuation-in-part of U.S. patent application Ser. No. 324,183, now abandoned, entitled "Novel Oxetanes and Use Thereof" filed Nov. 18, 1963 by D.R. Arnold and A. A. Sousa.

The present invention is directed to novel heterocyclic organic compounds and to a process for their preparation. In one aspect, this invention is directed to novel oxetanes. In a further aspect, this invention relates to certain novel oxetanes which are useful in fungicidal applications, particularly, as mildewcides.

Heretofore, a wide variety of synthetic methods have been reported in the literature for the preparation of oxetanes. However, most of these methods are not very general and frequently require starting materials which are exceedingly difficult to prepare. Moreover, the reported synthetic methods rarely give high yields and hence are undesirable for large scale commercial production.

It has recently been discovered that a wide variety of novel oxetanes can be conveniently prepared by the photocycloaddition of carbonyl compounds to olefins. In many instances, the yields of the desired oxetanes are high, sometimes nearly quantitative. Moreover, the starting materials are readily available and hence oxetanes can readily be obtained which were difficult or impossible to prepare by classical methods.

Accordingly, one or more of the following objects will be achieved by the practice of the instant invention. It is an object of this invention to provide a class of novel oxetanes. Another object of this invention is to provide a class of novel oxetanes which are characterized by the presence or a norbornyl moiety in the molecule. A further object is to provide novel 4-pyridyl-4-phenyl-3-oxatricyclo[4.2.1.0$^{2,5}$]nonanes. Another object is to provide certain novel oxetanes which are useful in agricultural and biological applications. A still further object of this invention is to provide certain novel oxetanes which are useful as mildewcides. Another object is to provide a process for the preparation of novel oxetanes. These and other objects will readily become apparent to those skilled in the art in the light of the teachings herein set forth.

The novel oxetanes of this invention can be represented by the structural formula:

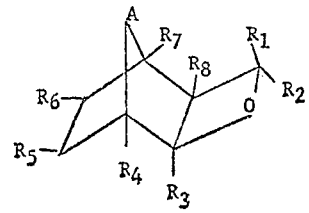

wherein A represents an oxy group or an alkylene group, i.e., methylene or substituted methylene groups; $R_1$ and $R_2$ individually represent hydrocarbyl, halohydrocarbyl, aminohydrocarbyl, alkoxyhydrocarbyl, aminoalkoxyhydrocarbyl, or heterocyclyl groups; and $R_3$–$R_8$ represent hydrogen, halogen, hydrocarbyl, halohydrocarbyl, alkoxyhydrocarbyl, hydroxyhydrocarbyl, alkoxycarbonylhydrocarbyl, and carboxy groups, with the provisos that: (1) $R_1$ and $R_2$ can together with the carbon atom to which they are attached represent the group

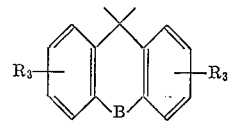

wherein $R_3$ is as above, and B represents a sulfonyl group, i.e.

a lower alkylene group of from 1 to 2 carbon atoms, or an alkyl-substituted lower alkylene group of from 2 to 10 carbon atoms, (2) $R_5$ and $R_6$ can together with the carbon atoms to which they are attached represent

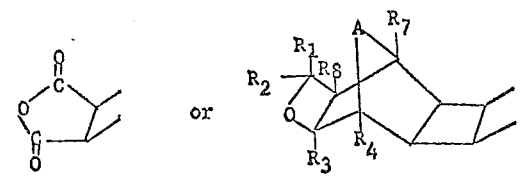

wherein $R_1$–$R_4$ and $R_7$ and $R_8$ are as above, and (3) when A is methylene, $R_1$ and $R_2$ are not both hydrocarbylaryl.

Preferred novel oxetanes encompassed by the aforementioned formula are those wherein A is methylene, $R_1$ and $R_2$ individually represent alkyl, alkenyl, aryl, alkaryl, aralkyl, cycloalkyl, bicycloalkyl, haloalkyl, haloaryl, haloalkaryl, halocarbonyl, alkoxyaryl, aminoalkyl, aminoaryl, alkylaminoalkyl, dialkylaminoalkyl, dialkylaminoalkoxyalkyl, pyridyl (ortho, meta and para), alkylpyridyl, piperidyl, piperidylalkyl, alkylpiperidyl, piperidinoalkyl, pyrimidyl, alkylpyrimidyl, pyrimidinylalkyl, pyrazolyl, pyrazyl, pyrazylalkyl, N-alkoxycarbonylpiperazinylalkyl, piperizinyl, N-alkylpiperazinylalkyl, morpholinyl, alkylmorpholinyl, 1,2,5,6 - tetrahydropyridyl, N-alkyl-1,2,5,6-tetrahydropyridyl, N-aryl-1,2,5,6 - tetrahydropyridyl, N-aralkyl - 1,2,5,6 - tetrahydropyridyl, carbamyl, alkylcarbamyl, cycloalkylcarbamyl, N-heterocyclocarbamyl and the like; and $R_3$–$R_8$ represent hydrogen, halogen, e.g., chloro, bromo, fluoro, iodo, alkyl, alkenyl, aryl, alkaryl, aralkyl, cycloalkyl, cycloalkenyl, bicycloalkyl, bicycloalkenyl, haloalkyl, haloaryl, haloalkaryl, halocycloalkyl; alkoxyalkyl, alkoxyaryl, aminoalkyl, aminoaryl, alkylaminoalkyl, dialkylaminoalkyl, dialkylaminoalkoxyalkyl and the like.

Particularly preferred oxetanes are those wherein the R variable contains up to 18 carbon atoms and wherein at least one of the $R_1$ and $R_2$ variables is a heterocyclic group composed of carbon, hydrogen, and from 1 to 2 ring nitrogen and/or oxygen atoms.

Illustrative novel oxetanes encompassed by the aforementioned formula include, among others, the 4,4-dihydrocarbyl - 3-oxatricyclo[4.2.1.0$^{2,5}$]nonanes, e.g., 4,4-dipropyl - 3-oxatricyclo[4.2.1.0$^{2,5}$]nonane, and the like; the halogenated 4,4 - dihydrocarbyl-3-oxatricyclo[4.2.1.0$^{2,5}$]nonanes, e.g., 4 - chloromethyl - 4-phenyl-3-oxatricyclo[4.2.1.0$^{2,5}$]nonane, 4,4 - di(para-chlorophenyl)-3-oxatricyclo[4.2.1.0$^{2,5}$]nonane, and the like; the 4-hydrocarbyl-4 - heterocyclyl-3-oxatricyclo[4.2.1.0$^{2,5}$]nonanes, e.g., 4-(orthopyridyl) - 4-phenyl-3-oxatricyclo[4.2.1.0$^{2,5}$]nonane, 4-(metapyridyl)-4-phenyl-3-oxatricyclo[4.2.1.0$^{2,5}$]nonane, 4 - (para-pyridyl) -4-phenyl-3-oxatricyclo[4.2.1.0$^{2,5}$]nonane, 4 - methyl-4-(para-pyridyl)-3-oxatricyclo[4.2.1.0$^{2,5}$]nonane, 4 - (metapyridyl) - 4 - biphenylyl-3-oxatricyclo[4.2.1.0$^{2,5}$]nonane, and the like; the 4,4-diheterocycyl-3-oxatricyclo[4.2.1.0$^{2,5}$]nonanes, e.g., 4,4-di(meta-pyridyl)-oxatricyclo[4.2.1.0$^{2,5}$]nonane, and the like; the halogenated 4 - hydrocarbyl - 4 - heterocyclyl-3-oxatricyclo[4.2.1.0$^{2,5}$]nonanes, e.g., 4-(para-chlorophenyl)-4-(para-pyridyl) - 3-oxatricyclo[4.2.1.0$^{2,5}$]nonane, and the like; the 4 - hydrocarbyl-4-pyridyl-3-oxatricyclo[4.2.1.0$^{2,5}$]nonanes having substituents on one or more of the carbon atoms of the norbornane moiety, e.g., 7(8)—carboxy-4-phenyl - 4-(para-pyridyl)-3-oxatricyclo[4.2.1.0$^{2,5}$]nonane, and the like.

It will be readily appreciated that a wide variety of isomeric oxetanes are encompassed by the instant invention. For example, when $R_1$ and $R_2$ are different, two geometric isomers can be obtained for the same product:

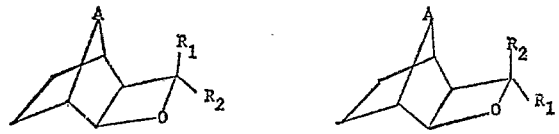

This is, of course, in addition to the usual isomeric forms possible when the $R_1$ and/or $R_2$ groups are themselves heterocyclic and can be attached to the oxetane ring in more than one position. Similarly, when the $R_5$ and $R_6$ of the general formula are other than hydrogen, isomeric products will also be obtained.

The novel oxetanes of this invention can be produced by the photocatalyzed reaction of a ketone with an olefinic compound, e.g., bicyclo-1,2,1-heptene-2, hereinafter referred to as norbornene, or various substituted norbornene.

The reaction producing the novel oxetanes of this invention is carried out by bringing the ketone and the olefinic compound into admixture in a suitable reactor and irradiating the mixture with light energy of catalytic wavelength, typically in the range of from about 2,000 to about 4,000 angstroms. The use of light energy of shorter wavelengths substantially below 2,000 angstroms may engender the photolytic decomposition of the reactants and/or the oxetane product and is therefore to be avoided, while little if any of the desired reaction occurs using light energy of longer wavelengths substantially above 4(000 angstroms. Thus, the term "light energy," as employed herein, contemplates wavelengths predominantly in the ultraviolet spectrum. Convenient sources of such light energy include, for instance, tungsten bulbs, daylight, mercury vapor and xenon arc lamps, etc.

The reaction of the ketone with the olefinic compound can be carried out in solution using an inert, normally liquid solvent such as a saturated aliphatic or aromatic hydrocarbon or halogen derivative thereof, as for instance, heptane, hexane, pentane, benzene, acetic acid, acetonitrile, carbon tetrachloride, and the like, especially those having a boiling point below about 100° C. The use of such a solvent is preferred. The reaction can, however, also be carried out "neat," i.e., in the absence of external solvent.

The proportion in which the reactants are utilized can vary broadly, and does not limit the invention. Typically, the reactants are employed in a proportion of from about 0.1 mole to about 10 moles of the ketone per mole of the olefinic compound. Higher or lower proportions of reactants can also be employed satisfactorily. However, the efficient utilization of the reactants will generally decrease when greater than stoichiometric, i.e., equimolar, proportions are employed.

The reaction temperature can also vary broadly, typically in the range of from about 0° C. to about 100° C., and preferably in the range of from about 10° C. to about 30° C. Here again, higher or lower reaction temperatures may also be employed satisfactorily. In any given instance, however, the temperature should not be so high as to engender the decomposition of the relatively heat-sensitive oxetane product, and is dependent to a large extent upon the identity of any external solvent employed. Thus, the temperature should not be so high as to volatilize the solvent, nor so low as to preclude its normally liquid form. Preferably, the temperature should also be consistent with the dissolution of any gaseous reactant in the solvent, i.e., should not volatilize the reactant from the solvent.

When within the above temperature range, the reaction is generally carried out, i.e., irradiation continued, for a period of from several hours to several days depending upon the concentration of reactants present, the wavelength and intensity of the light energy employed, etc. Longer or shorter reaction periods sufficient to produce the desired oxetane can also be utilized. Preferably, a stoichiometric amount or excess of the olefinic compound is admixed with the ketone and the reaction is carried out to completion as determined by periodically removing aliquots from the reaction mixture and subjecting the aliquots to infra-red analysis. Under such circumstances the completion of the reaction is indicated by the disappearance of the carbonyl peak in the infra-red spectrum, carbonyl absorption occurring at a wavelength of approximately 6 microns.

Any suitable vessel which will permit the transmission of light energy of the desired wavelength, as described above, can be employed as a reactor. Typically, Pyrex or quartz vessels are employed in this regard, Pyrex being preferred interposed between the reaction mixture and the source of light energy.

Upon completion of the reaction, the oxetane product, which is believed to have an exo configuration, and is ordinarily a colorless solid and crystalline in form, can be recovered in any convenient manner. For instance, the product can be recovered as the residue obtained upon the evaporation or distillation of any unreacted material and/or solvent present. The product can thereafter be purified, if desired, by extraction or recrystallization, etc.

The apparatus employed in the preparation of the oxetanes consisted of a quartz well (Hanovia No. 19434) with a Pyrex filter immersed in a Pyrex reaction vessel having a capacity of 200 milliliters. The reaction vessel was equipped at the bottom with a glass fitted gas inlet for the introduction of purge gas and gaseous reactions, and the top with two outlets, one protected by a mercury bubbler and the other covered by a rubber septum through which periodic withdrawal of aliquots of the reaction mixture could be made. The light source was a 450 watt (Hanovia No. 679A-36) mercury arc lamp. The apparatus was maintained at a temperature in the range of 5–10° C. by immersing it in a refrigerated bath and circulating cooling water through the well.

Unless otherwise indicated, all of the oxetane products described herein were prepared by essentially the same procedure using the appropriate ketone and olefinic compound as reactants, as indicated in Table A below. In each instance, the oxetane structure of the product was confirmed by infra-red analysis, oxetane absorption occurring at a wavelength of 10± 0.3 microns, and nuclear magnetic resonance.

EXPERIMENTAL PROCEDURE

A solution of 9.16 grams (0.05 mole) of meta-benzoylpyridine and 4.76 grams (0.05 mole) of norbornene in 200 milliliters of benzene was introduced into the reaction vessel and the vessel was purged with nitrogen. The light source irradiating the reaction mixture was turned on for a period of 24 hours. At the conclusion of this period, the benzene solvent was removed by evaporation under reduced pressure leaving an oily residue which was allowed to harden. The residue was extracted with n-hexane on a Soxhlet extractor until all soluble material was removed. Evaporation of the extract, followed by recrystallization from diethyl ether, yielded essentially pure 4-(metapyridyl) - 4 - phenyl - 3 - oxatricyclo[4.2.1.0$^{2,5}$]nonane, the composition of Example 8 in Table A. In a similar manner, the carbonyl compounds and olefins set forth in Table A were reacted to give the indicated oxetanes.

Certain of the novel oxetanes set forth in Table A were not prepared directly by the photocycloaddition of a carbonyl compound with an olefin, but rather are derivatives of other oxetanes, prepared by such method. For example, the novel oxetane of Example 10 was synthesized by the methyl bromination of 4-(para-pyridyl)-4-phenyl-3-oxatricyclo[4.2.1.0$^{2,5}$]nonane, the composition of Example 9. This was effected by bubbling methyl bromide through a methanol solution of the oxetane at room temperature. After stripping off the methanol, the product was crystallized from acetone. The oxetanes of Examples 11 and 12 were then prepared by reduction of the oxetane of Example 10. The 4-(N-methyl-4-pyridyl)-4-phenyl-3-oxatricyclo[4.2.1.0$^{2,5}$]nonyl bromide of Example 10 was reduced to 4 - (N-methyl-4-piperidyl)-4-phenyl-3-oxatricyclo[4.2.1.0$^{2,5}$]nonane with sodium borohydride. Thereafter, the 4 - (N - methyl - 4 - piperidyl)-4-phenyl-3-oxatricyclo[4.2.1.0$^{2,5}$]nonane was reduced in the presence of hydrogen and Adams catalyst (platinum oxide) to 4-(N-methyl - 4 - piperidyl) - 4 - phenyl - 3 - oxatricyclo [4.2.1.0$^{2,5}$]nonane.

The oxetanes of Examples 16, 17, 23, 24 and 25 were prepared by the reaction of 4-chloromethyl-4-phenyl-3-oxatricyclo[4.2.1.0$^{2,5}$]nonane, the product of Example 18, with piperidine, morpholine, N-methylpiperazine, and ethyl-N-piperazinocarboxylate respectively. The reactions were effected at reflux temperatures and the oxetanes recovered by conventional techniques.

In those instances wherein the reaction of the carbonyl compounds and olefins resulted in a mixture of isomeric products, separation was effected according to known techniques to provide the pure isomers.

TABLE A

| Ex. | Carbonyl compound | Olefin | Oxetane | Yield in percent | Calculated C | H | N | Cl | Found C | H | N | Cl |
|---|---|---|---|---|---|---|---|---|---|---|---|---|
| 1 | 1,1-bis(4-pyridyl)-ketone. | Norbornene. | (4—C$_5$H$_4$N)$_2$ | ~50 | 77.66 | 6.51 | | | 77.50 | 6.53 | | |
| 2 | 4-acetylpyridine | do | 4—C$_5$H$_4$N, CH$_3$ | 37 | 78.10 | 7.96 | | | 78.38 | 8.07 | | |
| 3 | 4-chloroacetophenone. | do | (4—Cl)C$_6$H$_4$, CH$_3$ | | 72.42 | 6.89 | | | 72.35 | 6.83 | | |
| 4 | 1,1-bis(3-pyridyl)-ketone. | do | (3—C$_5$H$_4$N)$_2$ | ~50 | 77.66 | 6.51 | | | 77.41 | 6.55 | | |
| 5 | 3-trifluoromethyl-acetophenone. | do | CH$_3$, (3—CF$_3$)C$_6$H$_4$ | 46 | 68.07 | 6.07 | | | 69.25 | 5.93 | | |
| 6 | 4-trifluoromethyl-acetophenone. | do | CH$_3$, (4—CF$_3$)C$_6$H$_4$ | 45 | 68.07 | 6.07 | | | 67.99 | 6.07 | | |
| 7 | 2-benzoylpyridine | do | C$_6$H$_5$, 2—C$_5$H$_4$N | 38 | 82.28 | 6.91 | | | 82.28 | 6.77 | | |

TABLE—Continued

| Ex. | Carbonyl compound | Olefin | Oxetane | Yield in percent | Calculated C | Calculated H | Calculated N | Calculated Cl | Found C | Found H | Found N | Found Cl |
|---|---|---|---|---|---|---|---|---|---|---|---|---|
| 8 | 3-benzoylpyridine | do | [structure: C₆H₅, 3—C₅H₄N] | 53 | 82.28 | 6.91 | | | 82.46 | 6.98 | | |
| 9 | 4-benzoylpyridine | do | [structure: C₆H₅, 4—C₅H₄N] | 67 | 82.28 | 6.91 | | | 82.28 | 6.81 | | |
| 10 | (Prepared from oxetane of Example 9) | | [structure: C₆H₅, (4—CH₃)C₅H₄N⁺Br⁻] | | | | | | | | | |
| 11 | Prepared from oxetane of Example 10 | | [structure: C₆H₅, (4—CH₃)—C₅H₇N] | 98 | 81.31 | 8.53 | 4.74 | | 81.14 | 8.68 | 5.07 | |
| 12 | (Prepared from oxetane of Example 11) | | [structure: C₆H₅, (4—CH₃)—C₅H₉N] | 74 | 80.75 | 9.15 | | | 80.87 | 9.19 | | |
| 13 | 1-(4-pyridyl)-1-(para-biphenyl)-ketone. | Norbornene | [structure: C₁₂H₉, 4—C₅H₄N] | | | | | | | | | |
| 14 | 4-benzoylpyridine | 5-carboxy-norborn-2-ene. | [structure: C₆H₅, 4—C₅H₄N, —COOH] | ~45 | 74.74 | 5.95 | | | 74.19 | 5.95 | | |
| 15 | do | 4-chloro-norborn-2-ene. | [structure: Cl, C₆H₅, 4—C₅H₄N] | | 73.18 | 5.81 | | | 73.17 | 5.88 | | |
| 16 | (Prepared from oxetane of Example 18) | | [structure: C₆H₅, CH₂—C₅H₁₀N] | 32 | 80.75 | 9.15 | | | 80.46 | 9.14 | | |
| 17 | do | | [structure: C₆H₅, CH₂—C₄H₆NO] | 63.5 | 76.21 | 8.41 | | | 76.31 | 8.64 | | |
| 18 | 1-phenyl-1-chloromethyl ketone. | Norbornene | [structure: C₆H₅, CH₂Cl] | 76 | 72.42 | 6.89 | | 14.25 | 72.61 | 6.99 | | 14.41 |

TABLE—Continued

| Ex. | Carbonyl compound | Olefin | Oxetane | Yield in percent | Calculated C | Calculated H | Calculated N | Calculated Cl | Found C | Found H | Found N | Found Cl |
|---|---|---|---|---|---|---|---|---|---|---|---|---|
| 19 | 1-(4-chlorophenyl)-1-(4-pyridyl)-ketone. | ___do___ | [structure: (4-Cl)C$_6$H$_5$, 4-C$_5$H$_4$N oxetane on norbornene] | 87 | 73.18 | 5.81 | | | 73.18 | 5.86 | | |
| 20 | 1,1-bis(4-pyridyl)-ketone. | 2,5-norbornadiene. | [structure with C$_6$H$_5$, 4-C$_5$H$_4$N groups, bis-oxetane on norbornadiene] | | 82.87 | 6.22 | | | 82.53 | 6.31 | | |
| 21 | Benzophenone | 5-carboxynorborn-2-ene | [structure: (C$_6$H$_5$)$_2$ oxetane with COOH] | | 78.72 | 6.29 | | | 78.53 | 6.23 | | |
| 22 | 1-phenyl-1-(paramethoxyphenyl)-ketone. | ___do___ | [structure: C$_6$H$_5$, (4-CH$_3$O—)C$_6$H$_4$, COOH] | | 79.01 | 6.63 | | | 79.27 | 6.73 | | |
| 23 | (Prepared from oxetane of Example 18) | | [structure: C$_6$H$_5$, CH$_2$NC$_5$H$_8$] | 70 | 81.35 | 8.55 | 4.74 | | 81.35 | 8.80 | 5.08 | |
| 24 | (Prepared from oxetane of Example 18) | | [structure: C$_6$H$_5$, CH$_2$NC$_4$H$_8$NCH$_3$] | 60 | 76.87 | 9.03 | 8.96 | | 76.58 | 9.23 | 9.46 | |
| 25 | (Prepared from oxetane of Example 18) | | [structure: C$_6$H$_5$, CH$_2$NC$_4$H$_8$NCO$_2$C$_2$H$_5$] | 68 | 71.31 | 8.16 | 7.56 | | 71.78 | 8.21 | 7.16 | |
| 26 | Dibenzsuberone | Norbornene. | [dibenzsuberone-norbornene oxetane structure] | 15.3 | 87.37 | 7.33 | | | 86.43 | 7.37 | | |
| 27 | ___do___ | 5-carboxynorborn-2-ene. | [structure with COOH] | 19.4 | 79.74 | 6.40 | | | 79.52 | 6.49 | | |
| 28 | ___do___ | 5-hydroxymethylnorborn-2-ene. | [structure with CH$_2$OH] | 18.8 | 87.30 | 7.65 | | | 87.21 | 7.49 | | |

TABLE—Continued

| | Carbonyl | | | Yield in percent | Elemental analysis in percent | | | | | | | |
|---|---|---|---|---|---|---|---|---|---|---|---|---|
| | | | | | Calculated | | | | Found | | | |
| Ex. | compound | Olefin | Oxetane | | C | H | N | Cl | C | H | N | Cl |
| 29 | Phenylglyoxyl-amide. | Norbornene. | (structure) | 86.5 | 74.05 | 7.04 | 5.76 | | 74.06 | 7.16 | 6.09 | |
| 30 | 2-chloro-thioxan-throne-10,10-dioxide. | do | (structure) | | | | | | | | | |

The novel oxetanes of this invention may be employed in a variety of commercial applications, salient among which is their use as mildewicides. Found to be particularly useful in this regard are the meta-pyridyl substituted oxetanes. The meta-pyridyl substituted oxetanes generally demonstrate a high degree of mildewcidal effectiveness at lower concentrations, or when employed at equal strength demonstrate superior mildewcidal effectiveness, as compared with the other oxetanes contemplated by this invention.

It has also been found that the novel oxetanes of this invention are especially effective against *Erysiphe polygoni*, the causal organism of powdery mildew of bean and *Podosphaera leucotricha*, the causal organism of powdery mildew of apples. Significantly, when applied to a mildew susceptible host in a suitable inert carrier, the oxetanes, and particularly the meta-pyridyl substituted oxetanes, demonstrate mildewcidal activity at concentrations as low as 0.1 part per million parts of carrier, or even at somewhat lower concentrations. Moreover, the oxetanes demonstrate good retention of mildewcidal activity for appreciable periods of time following their formation.

Typically, the oxetanes are employed as mildewcides in a concentration in the range of from about 4 to about 500 parts per million parts of carrier, although higher or lower mildewcidally effective amounts can also be employed. A preferred range is from about 20 to about 100 parts per million parts of carrier. Any suitable inert liquid or solid carrier such as water, talc, or the like, can be employed in this regard, as can readily be determined by one skilled in the art in the light of this disclosure.

The procedure employed in evaluating the novel oxetanes of this invention is as follows:

BIOLOGICAL TEST PROCEDURES

A stock suspension of the oxetane was prepared by dissolving one gram in 50 milliliters of acetone in which had been dissolved 0.1 gram of octylphenoxy polyethoxyethanol as an emulsifying agent. The resulting solution was mixed into 150 milliliters of water to give 200 milliliters of a suspension containing the oxetane in finely divided form. The various test concentrations described in parts per million were prepared by dilution of this stock solution.

Tender green beans were used as the host plant for the bean mildew, *Erysiphe polygoni*. A culture of this organism was maintained on bean plants in a greenhouse. Twenty-four hours prior to testing, uninfected plants with primary leaves fully expanded were inoculated by brushing their leaves lightly with plants taken from the stock culture.

The bean plants infected with mildew were sprayed on a revolving turntable for 30 seconds at a pressure of 40 p.s.i.g. Approximately 100 milliliters of spray were delivered. For control purpose, an equal volume of a water solution containing acetone emulsifier, and a conventional mildewcide, Karathane [a], in the same concentrations as the stock suspension above was also sprayed on other infected plants.

After the spray had dried, the plants were held in a greenhouse for a period of 7–10 days. At the end of this period, visual observations of mildew control were made according to the following designations:

5=100% control, no spots per leaf
4=1–3 spots per leaf
3=4–10 spots per leaf
2=Many but distinctly different spots
1=Leaf overrun with mildew; equal to check plants.

In a similar procedure, MacIntosh apple seedlings were used as the host plant for the apple mildew, *Podosphaera leucotricha*. The seedlings were inoculated twenty-four hours prior to initial spraying with a stock solution prepared as described above. Spraying was carried out as described above at weekly intervals for a period of three weeks. Visual observations of mildew control were made one week following each application in accordance with the designations set forth above. The treated plants were placed among untreated, heavily mildewed apple seedlings during the entire test period except for the time required for spraying.

The results obtained using the oxetane product of Example 8, viz. 4-(meta-pyridyl) - 4 - phenyl-3-oxatricyclo [4.2.1.0$^{2,5}$]-nonane, as the mildewcide are tabulated below in Tables B and C. Table B is concerned with the use of the oxetane as a bean mildew eradicant while Table C is concerned with the use of the oxetane as an apple mildew eradicant. The effectiveness rating is that made in accordance with the visual observations described above. The concentrations are in parts of mildewcide per million parts of carrier.

[a] 2,4-dinitro-6-(2-octyl)phenyl crotonate.

TABLE B

| Mildewcide | Concentration (p.p.m.) | Effectiveness rating, test— | | |
|---|---|---|---|---|
| | | 1 | 2 | 3 |
| Oxetane of Example 8 | 20 | 5 | 5 | |
| | 4 | 5 | 5 | 5 |
| | 0.8 | 5 | 4 | 4 |
| | 0.4 | 4 | | |
| Karathane | 20 | 5 | 5 | 5 |
| | 4 | 2 | 2 | 2 |
| | 0.8 | 1 | 1 | 1 |
| | 0.4 | 1 | | |

TABLE C

| Mildewcide | Concentration (p.p.m.) | Effectiveness rating | | | | | |
|---|---|---|---|---|---|---|---|
| | | First week | | Second week | | Third week | |
| | | Test 1 | Test 2 | Test 1 | Test 2 | Test 1 | Test 2 |
| Oxetane of Example 8 | 500 | 5 | 5 | 5 | 5 | 5 | 5 |
| | 100 | 5 | 5 | 5 | 5 | 5 | 5 |
| | 20 | 5 | 5 | 4 | 4 | 4 | 4 |
| | 4 | 3 | 5 | 2 | 3 | 2 | 3 |
| Karathane | 500 | 5 | 5 | 5 | 5 | 5 | 5 |
| | 100 | 5 | 5 | 4 | 5 | 4 | 5 |
| | 20 | 3 | 5 | 3 | 3 | 3 | 3 |
| | 4 | 2 | 4 | 2 | 2 | 1 | 2 |

The foregoing results clearly demonstrate the superior effectiveness of the oxetane as compared with the use of the conventional mildewcide. Control of the bean mildew was also demonstrated in similar manner using the oxetanes of Examples 7, 9, and 10.

The effective dose required for a "3" rating in the control of bean mildew was obtained for each of these oxetanes by plotting log concentration of oxetane versus probit rating and deriving the concentration of oxetane in parts per million parts of water required for 50 percent control of mildew. Thus derived, the $ED_3$ values were found to be as follows:

Mildewcide: $ED_3$
Oxetane of Ex. 8 _____ 0.8
Oxetane of Ex. 7 _____ 100
Oxetane of Ex. 9 _____ 40
Oxetane of Ex. 10 _____ 100

In addition to contacting the causative organism, mildew control is also realized by the application of the oxetanes of this invention in similar manner to an uninfected mildew susceptible host. Protection against the onset of mildew is thereby realized for appreciable periods of time during which the oxetanes are active as mildewcides.

Moreover, it has been found from screening tests that the oxetanes of htis invention, particularly the meta-pyridyl substituted oxetanes, are effective in other fungicidal applications. By way of illustration, the oxetane of Example 8 has also demonstrated activity as a soil fungicide, Pythium sp. being the causative organism in this instance.

It has also been observed that the oxetanes of this invention are useful in the control of two foliar diseases, tomato early blight (*Alternaria solani*) and cucumber anthracnose (*Colletotrichum lagenarium*). The composition of Example 8 was tested for these diseases in the following manner.

The causal organism of tomato early blight is cultured on potato dextrose agar at a temperature of 20° C. Transfers are made to petri dishes 8 days prior to testing and scraped and irradiated with ultraviolet for one minute one day prior to testing.

One tomato plant variety Bonny Best of a standard age and height is sprayed on a revolving turntable. A 100–110 ml. volume of the formulated water mixture of chemical is applied to each plant with a DeVilbiss spray gun, air pressure set at 40 pounds. Application of this volume of spray takes 25 seconds. Similar applications to other plants are made with a water solution containing acetone and emulsifier in the same concentration as the test mixture but without the candidate pesticide. These plants are untreated checks or controls for the experiment. As soon as the spray had dried, the plants are inoculated by again placing them on the turntable and spraying with a spore suspension of early blight (containing 12,000–15,000 spores per ml. of water) for 30 seconds at 20 pounds pressure.

The test compound was formulated by a standard procedure of solution in acetone, addition of an emulsifier, and dilution with water.

Following inoculation the plants are incubated for 24 hours at 70° F. and 100 percent relative humidity. The plants are then removed from the incubation chamber and held for an additional 24 hours at room temperature.

The degree of infection is visually rated according to the following designations:

5=no lesions (perfect control)
4=very few lesions
3=moderately infected
1=many lesions, equal to untreated control plants The results obtained using the oxetane product of Example 8 and a known fungicide are tabulated in Table D below:

TABLE D

| Compound | Concentration (p.p.m.) | Effectiveness rating |
|---|---|---|
| Oxetane of Example 8 | 500 | 4 |
| | 100 | 2 |
| | 20 | 1 |
| | 4 | |
| Zinc ethylene bisdithiocarbamate | 500 | |
| | 100 | 5 |
| | 20 | 4 |
| | 4 | 2 |

The causal organism of cucumber anthranose is cultured on freshly prepared lima bean agar. One week following inoculation pink spore masses are formed. An aqueous suspension containing 200,000–500,000 spores per ml. is prepared as inoculum.

Cucumber plants 2–4 weeks of age are the host plants. The plants are grown in 3 inch pots. Two plants per pot are sprayed on a revolving turntable. A 100–110 ml. volume of the formulated water mixture of the chemical is applied to the plants with a DeVilbiss spray gun with air pressure set at 40 pounds p.s.i. Application of this volume of spray takes 25 seconds. An equal volume of a water solution containing acetone and emulsifier in the same concentrations as the fungicidal mixture but without the candidate fungicide is also sprayed on 4 cucumber plants which are held as untreated checks or controls. As soon as the spray has dried, the plants are inoculated by again placing them on the turntable and spraying with the spore suspension of anthracnose for 30 seconds at 20 pounds p.s.i.

The test compounds are formulated by a standard procedure of solution in acetone, addition of an emulsifier, and dilution with water.

Following inoculation the plants are incubated for 24 hours at 70° F. and 100 percent relative humidity. The plants are then removed from the incubation chamber and held at 80° F. and 50 percent relative humidity until symptoms of disease develop.

One week after inoculation counts are made of the total number of lesions found on the primary leaves of each plant, treated and untreated. The percent control is calculated, and results are reported according to the following designations:

5=90–100% control
4=70–89% control
3=50–69% control
2=25–49% control
1=0–24% control The results obtained using the oxetane product of Example 8 and a known fungicide are tabulated in Table E below:

TABLE E

| Compound | Concentration (p.p.m.) | Effectiveness rating |
|---|---|---|
| Oxetane of Example 8 | 500 | 4 |
|  | 100 | 1 |
|  | 20 | 1 |
|  | 4 |  |
| Manganese bisdithiocarbamate | 500 |  |
|  | 100 | 5 |
|  | 20 | 3 |
|  | 4 | 2 |

What is claimed is:

1. A mildewcidal composition comprising, an inert carrier, and a mildewcidal effective amount of an oxetane of the formula:

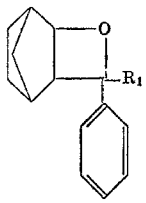

wherein $R_1$ is pyridyl.

2. The mildewcidal composition according to claim 1 wherein said oxetane is 4-(meta-pyridyl)-4-phenyl-3-oxatricyclo[4.2.1.0$^{2,5}$]nonane.

3. A method of controlling mildew which comprises contacting the mildew causative organism with a mildewcidal amount of an oxetane of the formula:

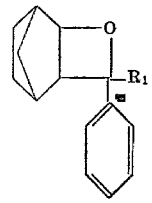

wherein $R_1$ is pyridyl.

4. The method according to claim 3 wherein said oxetane is 4-(meta-pyridyl) - 4 - phenyl - 3 - oxatricyclo-[4.2.1.0$^{2,5}$]nonane.

5. The method for protecting a mildew-susceptible host against mildew which comprises applying to said host a mildewcidal amount of an oxetane of the formula:

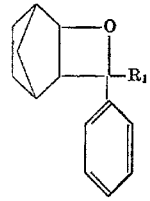

wherein $R_1$ is pyridyl.

6. The method according to claim 5 wherein said oxetane is 4-meta-pyridyl) - 4 - phenyl - 3 - oxatricyclo-[4.2.1.0.$^{2,5}$]nonane.

References Cited

UNITED STATES PATENTS 3,146,180   8/1964   Cenci _____ 204—162

OTHER REFERENCES

Scharf et al.: Tetrahedron Letters, June 1963, pp. 821-3.

JEROME D. GOLDBERG, Primary Examiner

A. J. ROBINSON, Assistant Examiner